(12) United States Patent
Lin et al.

(10) Patent No.: US 9,448,464 B2
(45) Date of Patent: Sep. 20, 2016

(54) PROJECTOR AND PROJECTING LENS OF THE PROJECTOR

(71) Applicants: Yi-Jou Lin, Taichung (TW); Hsin-Ying Wu, Taichung (TW)

(72) Inventors: Yi-Jou Lin, Taichung (TW); Hsin-Ying Wu, Taichung (TW)

(*) Notice: Subject to any disclaimer, the term of this patent is extended or adjusted under 35 U.S.C. 154(b) by 205 days.

(21) Appl. No.: 14/521,732

(22) Filed: Oct. 23, 2014

(65) Prior Publication Data

US 2016/0116830 A1    Apr. 28, 2016

(51) Int. Cl.
| | |
|---|---|
| G03B 21/14 | (2006.01) |
| G02B 13/18 | (2006.01) |
| G03B 21/28 | (2006.01) |
| G02B 17/08 | (2006.01) |
| G02B 17/00 | (2006.01) |
| G02B 13/16 | (2006.01) |
| G02B 5/00 | (2006.01) |
| G02B 21/28 | (2006.01) |

(52) U.S. Cl.
CPC ............ *G03B 21/142* (2013.01); *G02B 5/005* (2013.01); *G02B 13/16* (2013.01); *G02B 17/008* (2013.01); *G02B 17/08* (2013.01); *G02B 21/28* (2013.01)

(58) Field of Classification Search
CPC .. G03B 21/28; G03B 21/142; G03B 21/2066
USPC .............................. 353/97, 98; 359/726–736
See application file for complete search history.

(56) References Cited

U.S. PATENT DOCUMENTS

| | | | | |
|---|---|---|---|---|
| 2010/0208364 | A1* | 8/2010 | Minefuji | G02B 17/0816 359/731 |
| 2014/0022519 | A1* | 1/2014 | Amano | G02B 13/18 353/85 |

* cited by examiner

*Primary Examiner* — Bao-Luan Le
*Assistant Examiner* — Christopher Lamb, II
(74) *Attorney, Agent, or Firm* — Ming Chow; Sinorica, LLC

(57) ABSTRACT

A projector includes an image beam generator and a projecting lens. The projecting lens includes a relay system and a projection system. The relay system has a focusing set and a converging set, and the projection system has a projection lens group and a reflector. The image beam generator generates an image beam, and emits it to the projecting lens, and the image beam emits through the focusing set, the converging set, and the projection lens group in sequence, and then is reflected by the reflector to enter the projection lens group again. After leaving the projection lens group the image beam emits through a lens of the converging set, and then is projected onto a screen.

15 Claims, 5 Drawing Sheets

PROJECTOR AND PROJECTING LENS OF THE PROJECTOR

BACKGROUND OF THE INVENTION

1. Field of the Invention

The present invention relates generally to a projection device, and more particularly to a projector and a projecting lens of the projector.

2. Description of the Related Art

With advancement in technology, projectors have become the most popular devices used in a presentation. A projecting lens in a projector is the most important element to clearly show images on a screen. In order to use the projector in a limited space, short-throw projection is a common requirement in the modern projector. A conventional projecting lens for short-throw projection usually has a lot of large lenses to obtain short-throw projection and high optical performance.

Therefore, the size and weight of the conventional projecting lens for short-throw projection conflicts with the current design focus of projectors, which is miniaturization and lightweight. Besides, it takes a high cost to manufacture the conventional projecting lenses because of their sizes.

In order to improve the above drawback, a rear-projection projector is provided in the market. The rear-projection projection is provided with a reflector to reflect the image beam of the projector to a screen. Such rear-projection projector does not provide focusing function, so that the screen must be placed at a preset location, which has a fixed distance from the projector. It is unadjustable to meet the environment where the projector is going to project the image. In conclusion, the conventional projector and its projecting lens still need to be improved.

SUMMARY OF THE INVENTION

The primary objective of the present invention is to provide a projector and a projecting lens, which has a small size, low cost, high optical performance, and is capable of focusing.

According to the objective of the present invention, the present invention provides a projector an image beam generator for generating an image beam and a projecting lens for receiving the image beam from the image beam generator and projecting the image beam onto a screen. The projecting lens includes a relay system and a projection system, and the relay system is closer to the image beam generator than the projection system. The relay system has a focusing set and a converging set, and the focusing set is closer to the image beam generator than the converging set. The focusing set has at least a lens, and the converging set has at least a lens. The focusing set is between the image beam generator and the converging set, and is reciprocated relative to the converging set. The projection system has a projection lens group and a reflector, and the projection lens group is between the relay system and the reflector. The projection lens group has a first optical surface and a second optical surface, and the first optical surface is closer to the converging set than the second optical surface.

The present invention further provides a projecting lens, which includes a relay system and a projection system. The relay system includes a focusing set and a converging set, wherein the focusing set has at least a lens, and the converging set has at least a lens; the focusing set is reciprocated relative to the converging set. The projection system including a projection lens group and a reflector, wherein the projection lens group is between the reflector and the focusing set; the projection lens group has a first optical surface and a second optical surface, and the first optical surface is closer to the converging set than the second optical surface.

Therefore, the image beam of the image beam generator emits through the focusing set and the converging set in sequence, and then enters the projection lens group via the first optical surface, and leaves the projection lens group via the second optical surface to be reflected by the reflector; and then the image beam enters the projection lens group again via the second optical surface, and then leaves the projection lens group via the first optical surface to be projected onto a screen.

Therefore, the design of the present invention may reduce the size of the projector, and lower the cost of manufacturing. In addition, the projector is capable of focusing to make the projector be used in different places.

DETAILED DESCRIPTION OF THE INVENTION

Figure 1:
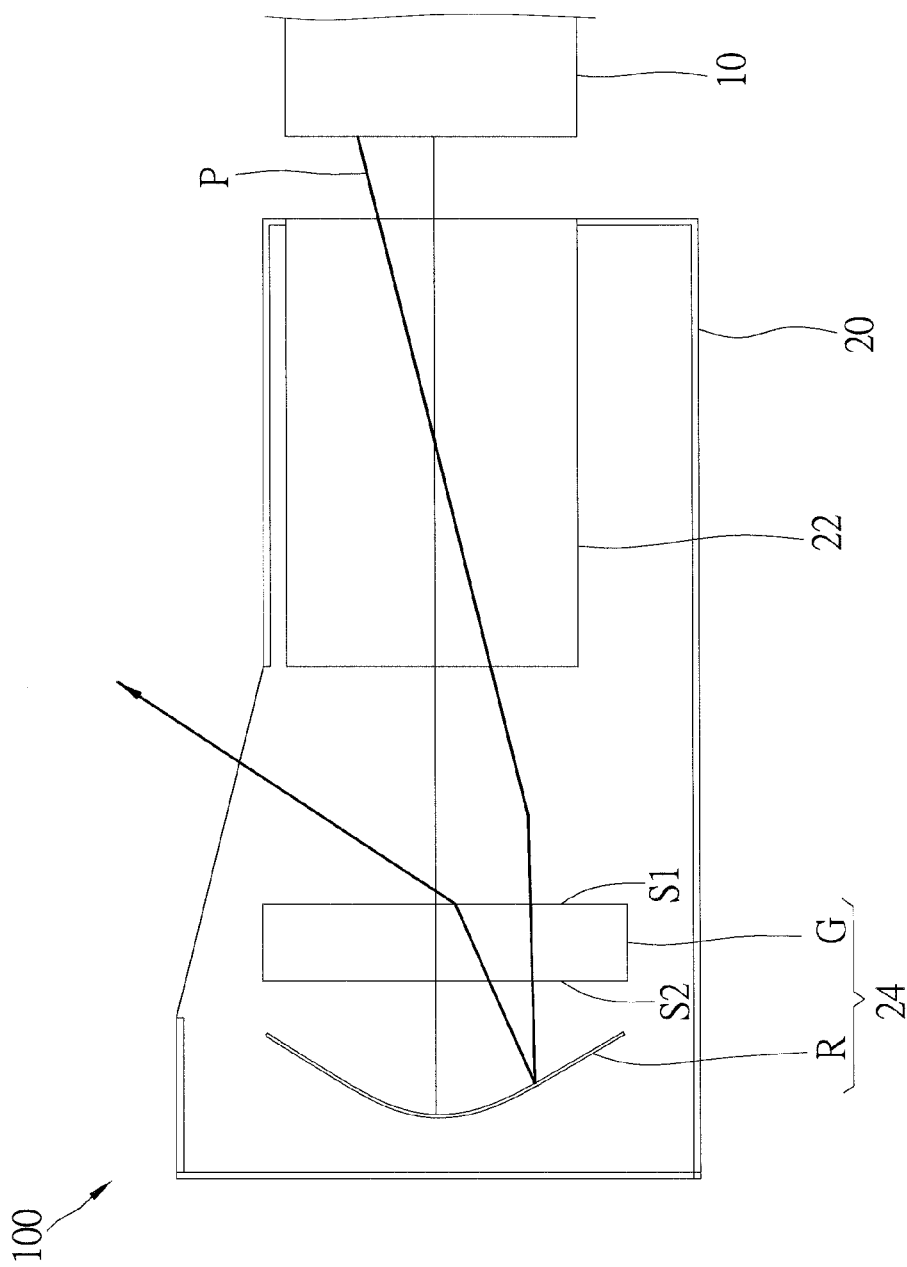
FIG. 1 is a sketch diagram of the projector of a preferred embodiment of the present invention.
Figure 2:
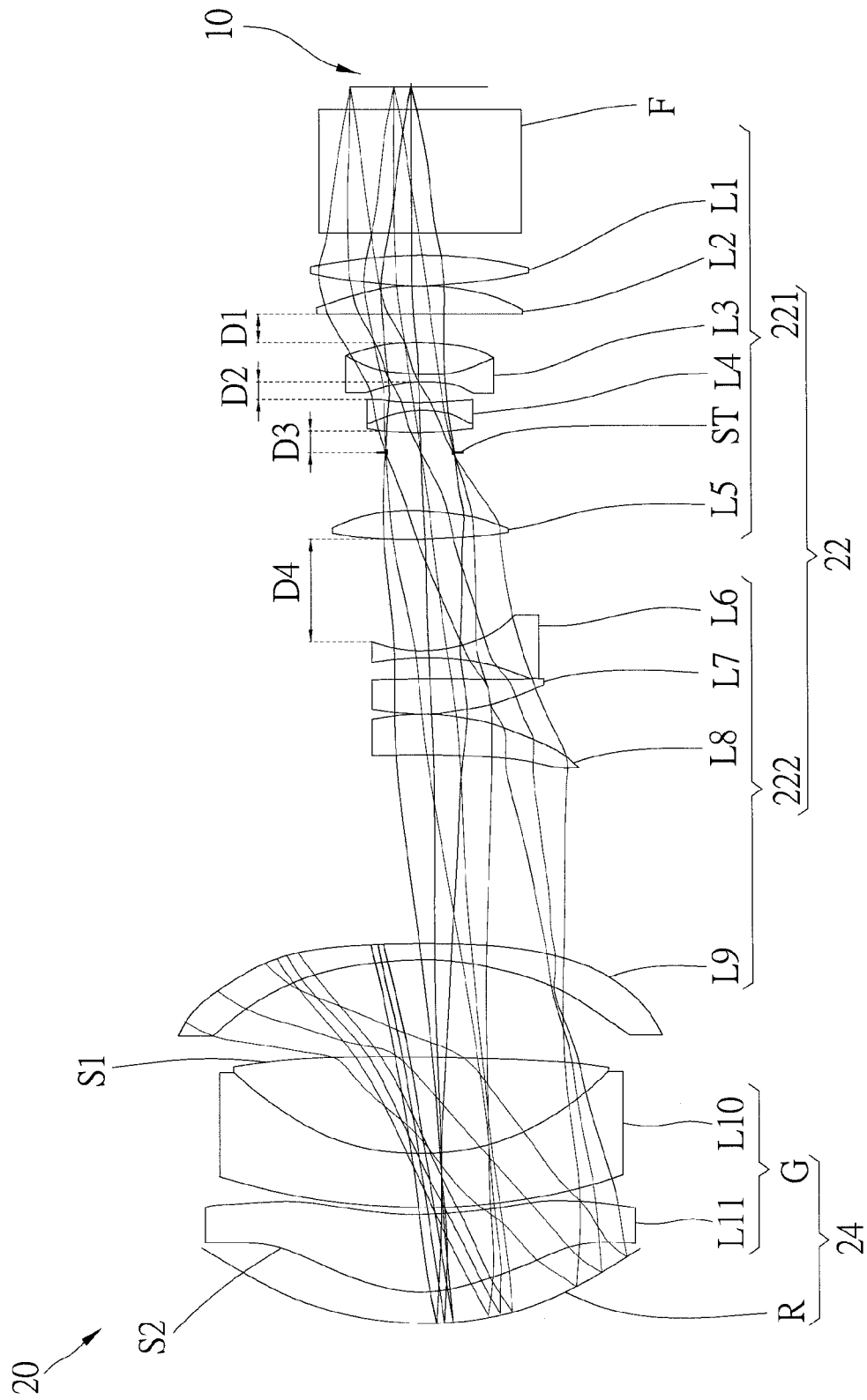
FIG. 2 is a sketch diagram of the arrangement of the lenses of the projecting lens of the preferred embodiment of the present invention.
Figure 3:
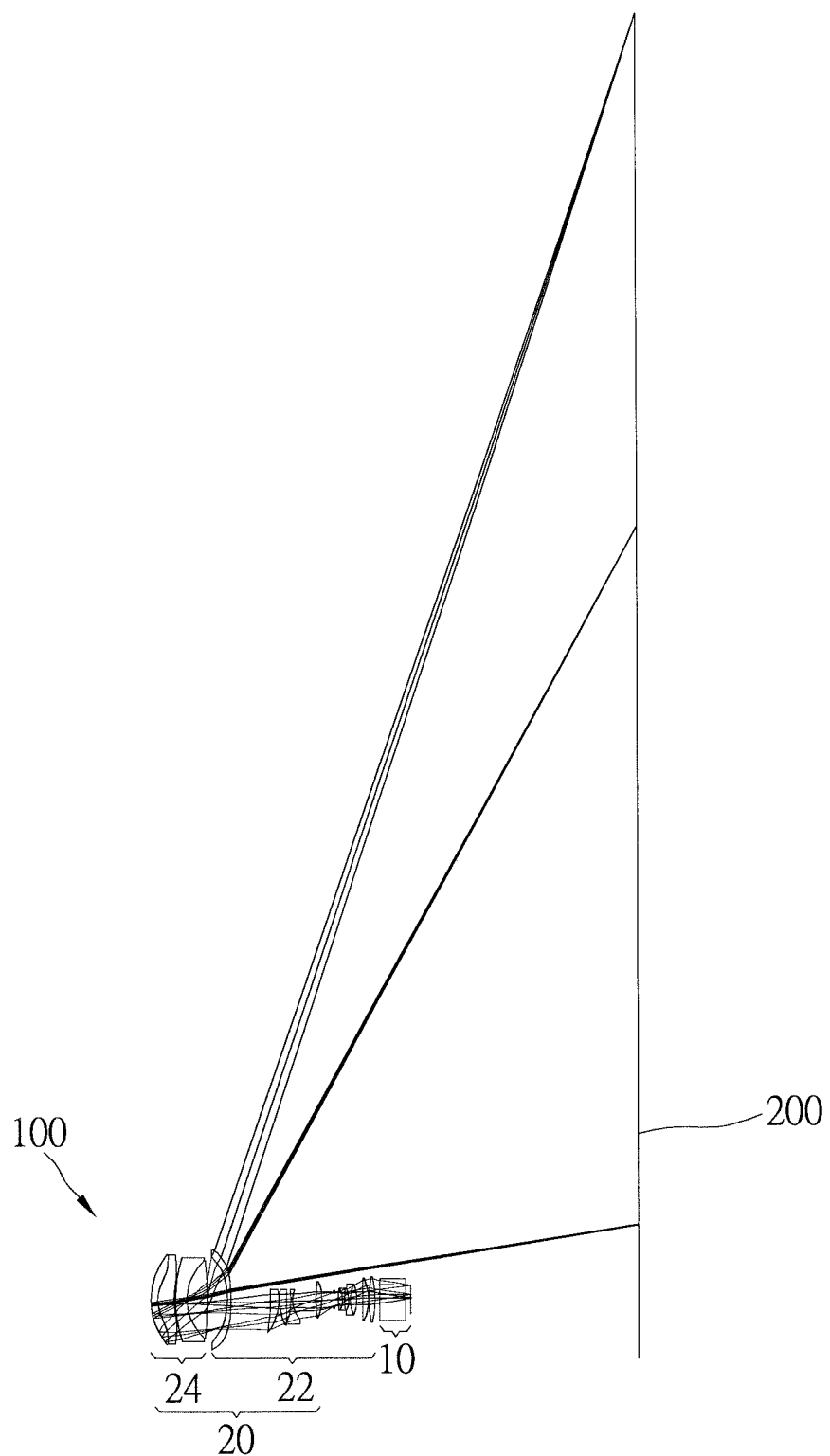
FIG. 3 is a sketch diagram of the preferred embodiment of the present invention, showing the light paths emitting through the projecting lens and to the screen.
Figure 4A:
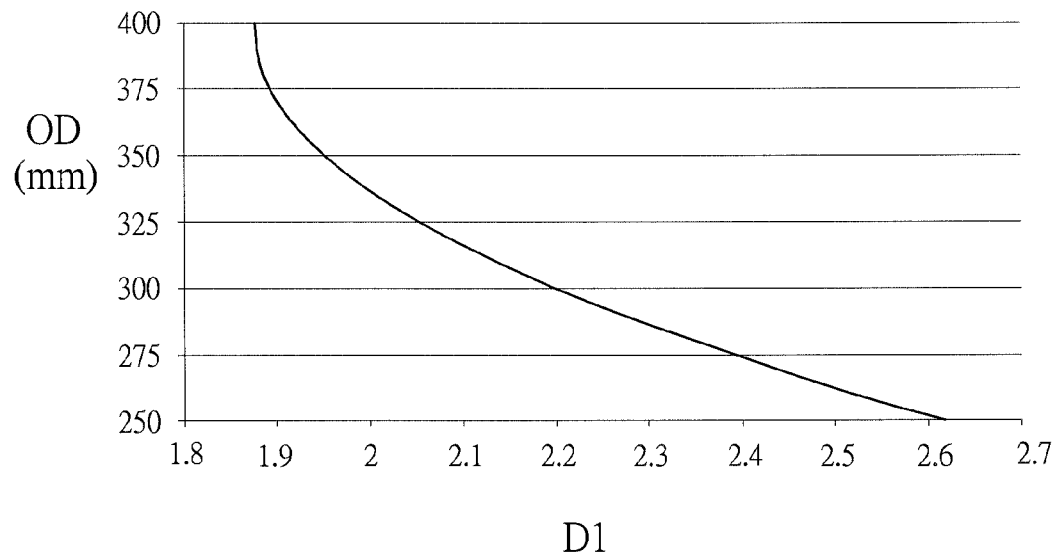
FIG. 4A to FIG. 4D are curve diagrams, showing relationship between the object distances and the distances between the lenses.
Figure 4B:
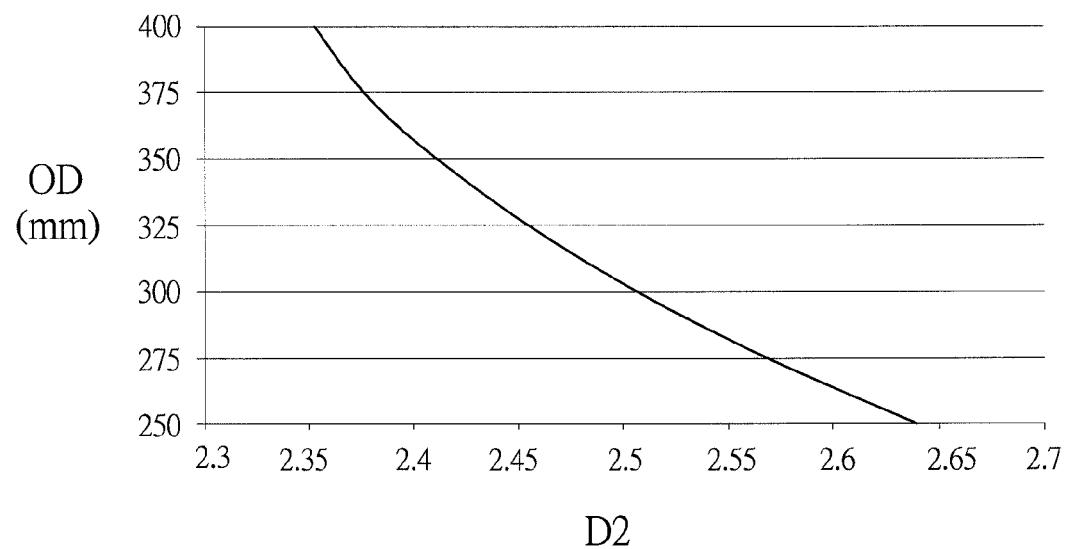
Figure 4C:
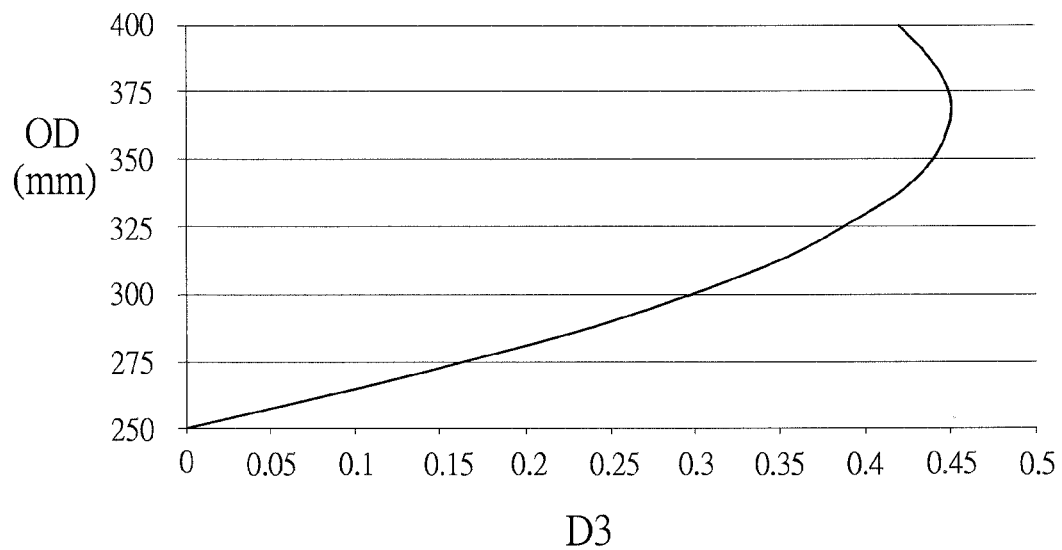
Figure 4D:
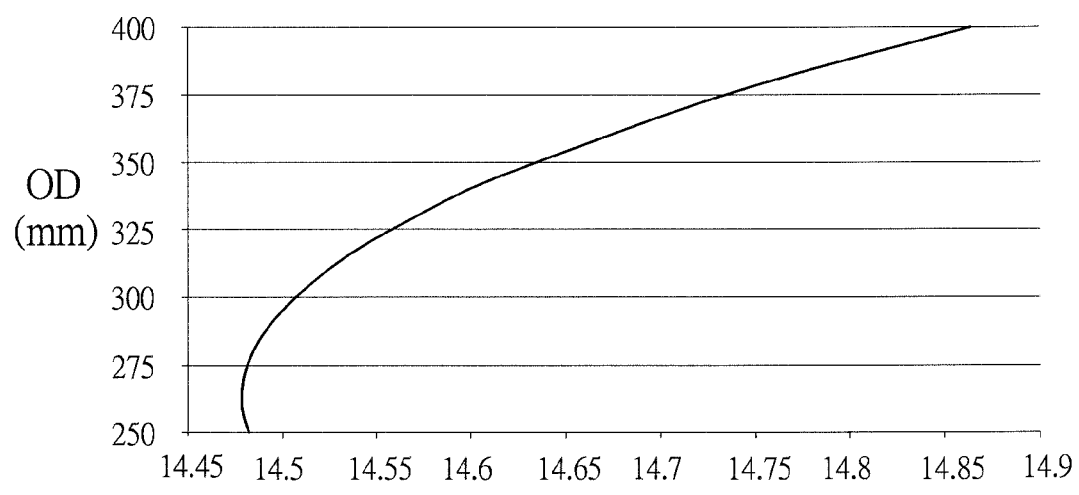

As shown in FIG. 1 to FIG. 3, a projector 100 of the preferred embodiment of the present invention includes an image beam generator 10 and a projecting lens 20. The image beam generator 10 reads image data and generates an image beam P, which contains an image of the image data, accordingly. The image beam generator 10 has a prism F through which the image beam P emits. The image beam P of the image beam generator 10 emits through the projecting lens 20 to be projected onto a screen. The projecting lens 20 includes a relay system 22 and a projection system 24.

As shown in FIG. 2, the relay system 22 includes a shielding lens L1, a focusing set 221, and a converging set 222 in sequence from a side proximal to the image beam generator 10 to a side distal to the image beam generator 10. The shielding lens L1 is closest to the image beam generator 10 which serves a predetermined optical function as well as stops dust going into the projecting lens 20 for protection. The focusing set 221 is between the converging set 222 and the image beam generator 10, and the focusing set 221 is moved relative to the converging set 222 for focusing. In the present embodiment, the focusing set 221 includes four lenses L2-L5 in sequence and an aperture ST, wherein the aperture ST is between the lens L4 and the lens L5. The lenses L2-L5 respectively form a plurality of focusing lens groups, and each focusing lens group is moved in a predetermined path (the paths of the focusing lens groups are different) to focus an object. FIG. 4A to FIG. 4D show relationships between object distances (OD) and distances between two neighboring elements of the focusing set 221, wherein D1 is the distance between L2 and L3, D2 is the distance between L4 and L5, D3 is the distance between L4 and aperture ST, and D4 is the distance between L5 and L6.

The object distance (OD) changes between 250 mm and 400 mm, and the detail is shown in Table 1:

TABLE 1

| OD (mm) | D1(mm) | D2(mm) | D3(mm) | D4(mm) |
| --- | --- | --- | --- | --- |
| 250 | 14.482277 | −0.005251 | 2.642403 | 2.619951 |
| 275 | 14.481682 | 0.167873 | 2.569659 | 2.388488 |
| 300 | 14.506845 | 0.3 | 2.50671 | 2.200091 |
| 325 | 14.557766 | 0.39113 | 2.453557 | 2.05476 |
| 350 | 14.634446 | 0.441262 | 2.410198 | 1.952495 |
| 375 | 14.736884 | 0.450398 | 2.376634 | 1.893296 |
| 400 | 14.865081 | 0.418536 | 2.352866 | 1.877163 |

The converging set 222 refracts the image beam, and emits it to the projection system 24 according to a predetermined optical performance. In the present embodiment, the converging set 222 includes four lenses L6-L9, and upper portions of the lenses L6-L8 are removed, which means that the lenses L6-L8 are asymmetrical lenses. In practice, the quantities and shapes of the lenses of the focusing set 221 and the converging set 222 can change according to various requirements.

As shown in FIG. 1 and FIG. 2, the projection system 24 includes a projection lens group G and a reflector R, wherein the projection lens group G is between the reflector R and the relay system 22. The projection lens group G includes a compound lens L10 and a single lens L11. The compound lens L10 has a first optical surface S1 facing the relay system 22, and the single lens L11 has a second optical surface S2 facing the reflector R. The first optical surface S1 is closer to the relay system 22 than the second optical surface S1. The reflector R has an aspheric concave surface facing the projection lens group G. This aspheric concave surface can be changed, such as a spherical surface, according to the specified requirements.

As a result, as shown in FIGS. 1 to 3, after the image beam P from the image beam generator 10 enters the projecting lens 20, it emits through the shielding lens L1, the focusing set 221, and the converging set 222 in sequence, and then enters the projection lens group G via the first optical surface S1, and leaves it via the second optical surface S2. After that, the image beam P is reflected by the reflector R, and then emits into the projection lens group G again via the second optical surface S2. Next, the image beam P leaves the projection lens group G via the first optical surface S1, and then emits through the lens L9, which is the lens of the converging set 222 closest to the projection system 24, and finally is projected onto a screen 200.

It is noted that the image beam P emits through the projection lens group G twice due to the reflector R, and it may reduce the size and volume of the projecting lens, and still keep high optical performance and short-throw projection function.

As shown in FIG. 2, the optical elements (L1-L9 and the aperture ST) in the relay system 22 are more than the optical elements (L10, L11, and the reflector R) in the projection system 24, which provides a good optical performance while the image beam P is emitting through the relay system 22 to obtain a good quality image in short-throw projection.

In addition, a cross-sectional area of the image beam P while the image beam P leaves the first optical surface S1 is smaller than a half of an area of the first optical surface S1. The image beam P from the image ray generator 10 (before being reflected by the reflector R) and the image beam P from the projection system 24 (after being reflected by the reflector R) do not cross in the lens L9, which is the last lens the image rays P passing through before it leaves the projecting lens 20. It may avoid optical interference to ensure higher optical performance and high image quality.

The description above is a few preferred embodiments of the present invention and the equivalence of the present invention is still in the scope of claim construction of the present invention. For example, the shielding lens could be movable to further separate the image beam P before reflection from the image beam P after reflection.

What is claimed is:

1. A projector, comprising:
an image beam generator for generating an image beam; and
a projecting lens for receiving the image beam from the image beam generator and projecting the image beam onto a screen, wherein the projecting lens includes a relay system and a projection system, and the relay system is closer to the image beam generator than the projection system;
wherein the relay system has a focusing set and a converging set, and the focusing set is closer to the image beam generator than the converging set; the focusing set has at least a lens, and the converging set has at least a lens; the focusing set is between the image beam generator and the converging set, and is reciprocated relative to the converging set;
wherein the projection system has a projection lens group and a reflector, and the projection lens group is between the relay system and the reflector; the projection lens group has a first optical surface and a second optical surface, and the first optical surface is closer to the converging set than the second optical surface;
wherein the image beam of the image beam generator emits through the focusing set and the converging set in sequence, and then enters the projection lens group via the first optical surface, and leaves the projection lens group via the second optical surface to be reflected by the reflector; and then the image beam enters the projection lens group again via the second optical surface, and then leaves the projection lens group via the first optical surface to be projected onto a screen.

2. The projector as defined in claim 1, wherein the converging set has a plurality of lenses; the image beam, which leaves the projection lens group via the first optical surface, emits through the lens of the converging set, which is closest to the projection lens group, before being projected onto the screen.

3. The projector as defined in claim 2, wherein the image beam before reflection and the image beam after reflection does not cross each other in one of the lenses of the projecting lens, which is the last lens for the image beam passing through before leaving the projecting lens.

4. The projector as defined in claim 1, wherein the image beam before reflection and the image beam after reflection does not cross each other in one of the lenses of the projecting lens, which is the last lens for the image beam passing through before leaving the projecting lens.

5. The projector as defined in claim 1, wherein some of the lenses of the focusing set are asymmetrical lenses.

6. The projector as defined in claim 1, wherein a cross-sectional area of the image beam on the first optical surface when the image beam leaves the projection lens group is equal to or less than a half of an area of the first optical surface.

7. The projector as defined in claim 1, wherein the projecting lens further includes a shielding lens between the focusing set and the image beam generator.

8. The projector as defined in claim 1, wherein the focusing set further includes an aperture between two lenses of the focusing set.

9. A projecting lens for receiving an image beam and projecting the image beam onto a screen, comprising:
a relay system including a focusing set and a converging set, wherein the focusing set has at least a lens, and the converging set has at least a lens; the focusing set is reciprocated relative to the converging set; and
a projection system including a projection lens group and a reflector, wherein the projection lens group is between the reflector and the focusing set; the projection lens group has a first optical surface and a second optical surface, and the first optical surface is closer to the converging set than the second optical surface;
wherein the image beam emits through the focusing set and the converging set in sequence, and then enters the projection lens group via the first optical surface, and leaves the projection lens group via the second optical surface to be reflected by the reflector; and then the image beam enters the projection lens group again via the second optical surface, and then leaves the projection lens group via the first optical surface to be projected onto a screen.

10. The projecting lens as defined in claim 9, wherein the converging set has a plurality of lenses to form a plurality of focusing lens groups; the focusing lens groups are moved relative to the converging set, and the focusing lens groups move in different paths respectively.

11. The projecting lens as defined in claim 10, wherein the focusing set further includes an aperture between two lenses of the focusing set.

12. The projecting lens as defined in claim 9, wherein some of the lenses of the focusing set are asymmetrical lenses.

13. The projecting lens as defined in claim 9, wherein the projecting lens further includes a shielding lens, and the focusing set is between the shielding lens and the converging set.

14. The projecting lens as defined in claim 9, wherein the reflector has a concave surface facing the projection lens group.

15. The projecting lens as defined in claim 9, wherein the reflector has an aspheric surface facing the projection lens group.

* * * * *